US009710511B2

(12) United States Patent
Wright et al.

(10) Patent No.: US 9,710,511 B2
(45) Date of Patent: Jul. 18, 2017

(54) DYNAMIC TABLE INDEX MAPPING

(71) Applicant: Walleye Software, LLC, Plymouth, MN (US)

(72) Inventors: Charles Wright, Cortlandt Manor, NY (US); Ryan Caudy, New York, NY (US); David R. Kent, IV, Colorado Springs, CO (US); Mark Zeldis, Randolph, NJ (US); Radu Teodorescu, New York, NY (US)

(*) Notice: Subject to any disclaimer, the term of this patent is extended or adjusted under 35 U.S.C. 154(b) by 0 days.

(21) Appl. No.: 15/154,990

(22) Filed: May 14, 2016

(65) Prior Publication Data

US 2016/0335302 A1 Nov. 17, 2016

Related U.S. Application Data

(60) Provisional application No. 62/161,813, filed on May 14, 2015.

(51) Int. Cl.
*G06F 7/00* (2006.01)
*G06F 17/00* (2006.01)
*G06F 17/30* (2006.01)
*G06F 3/0482* (2013.01)
*G06F 3/0489* (2013.01)
*G06F 17/22* (2006.01)
*G06F 17/24* (2006.01)
*G06F 17/27* (2006.01)
(Continued)

(52) U.S. Cl.
CPC ...... *G06F 17/30368* (2013.01); *G06F 3/0481* (2013.01); *G06F 3/0482* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 15/17331* (2013.01); *G06F 17/2235* (2013.01); *G06F 17/24* (2013.01); *G06F 17/246* (2013.01); *G06F 17/276* (2013.01); *G06F 17/2715* (2013.01); *G06F 17/30117* (2013.01); *G06F 17/30312* (2013.01); *G06F 17/30315* (2013.01); *G06F 17/30321* (2013.01); *G06F 17/30324* (2013.01);
(Continued)

(58) Field of Classification Search
CPC .................................... G06F 2201/84
USPC .................................. 707/625, 711
See application file for complete search history.

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

"IBM Informix TimeSeries data management", dated Jan. 18, 2016. Retrieved from https://web.archive.org/web/20160118072141/http://www-01.ibm.com/software/data/informix/timeseries/.
(Continued)

*Primary Examiner* — Van Oberly
(74) *Attorney, Agent, or Firm* — Carmichael IP, PLLC

(57) ABSTRACT

Described are methods, systems and computer readable media for external table index mapping.

18 Claims, 9 Drawing Sheets

(51) Int. Cl.

| | | |
|---|---|---|
| *G06F 12/084* | (2016.01) | |
| *H04L 12/58* | (2006.01) | |
| *G06F 15/173* | (2006.01) | |
| *G06F 3/0481* | (2013.01) | |
| *G06F 3/0484* | (2013.01) | |
| *G06F 3/0485* | (2013.01) | |
| *G06F 12/02* | (2006.01) | |
| *G06F 9/44* | (2006.01) | |
| *G06F 9/45* | (2006.01) | |
| *H04L 29/08* | (2006.01) | |
| *G06F 3/06* | (2006.01) | |
| *G06F 11/14* | (2006.01) | |
| *H04L 29/06* | (2006.01) | |
| *G06F 9/445* | (2006.01) | |
| *H04L 12/18* | (2006.01) | |
| *H04L 29/12* | (2006.01) | |

(52) U.S. Cl.
CPC .. *G06F 17/30327* (2013.01); *G06F 17/30333* (2013.01); *G06F 17/30336* (2013.01); *G06F 17/30339* (2013.01); *G06F 17/30345* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30454* (2013.01); *G06F 17/30477* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30958* (2013.01); *G06F 17/30997* (2013.01); *H04L 12/18* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/34* (2013.01); *H04L 67/42* (2013.01); *H04L 69/16* (2013.01); *G06F 2201/805* (2013.01); *G06F 2201/84* (2013.01); *G06F 2212/60* (2013.01)

(56) References Cited

U.S. PATENT DOCUMENTS

| | | | |
|---|---|---|---|
| 5,469,567 | A | 11/1995 | Okada |
| 5,504,885 | A | 4/1996 | Alashqur |
| 5,530,939 | A | 6/1996 | Mansfield et al. |
| 5,568,632 | A * | 10/1996 | Nelson ............. G06F 12/121 711/128 |
| 5,673,369 | A | 9/1997 | Kim |
| 5,701,461 | A | 12/1997 | Dalal et al. |
| 5,701,467 | A | 12/1997 | Freeston |
| 5,764,953 | A | 6/1998 | Collins et al. |
| 5,787,428 | A | 7/1998 | Hart |
| 5,806,059 | A | 9/1998 | Tsuchida et al. |
| 5,859,972 | A | 1/1999 | Subramaniam et al. |
| 5,875,334 | A | 2/1999 | Chow et al. |
| 5,878,415 | A | 3/1999 | Olds |
| 5,890,167 | A | 3/1999 | Bridge et al. |
| 5,899,990 | A | 5/1999 | Maritzen et al. |
| 5,920,860 | A | 7/1999 | Maheshwari et al. |
| 5,943,672 | A | 8/1999 | Yoshida |
| 5,960,087 | A | 9/1999 | Tribble et al. |
| 5,991,810 | A | 11/1999 | Shapiro et al. |
| 5,999,918 | A | 12/1999 | Williams et al. |
| 6,006,220 | A | 12/1999 | Haderle et al. |
| 6,032,144 | A | 2/2000 | Srivastava et al. |
| 6,032,148 | A | 2/2000 | Wilkes |
| 6,038,563 | A | 3/2000 | Bapat et al. |
| 6,058,394 | A | 5/2000 | Bakow et al. |
| 6,061,684 | A | 5/2000 | Glasser et al. |
| 6,138,112 | A | 10/2000 | Slutz |
| 6,266,669 | B1 | 7/2001 | Brodersen et al. |
| 6,289,357 | B1 | 9/2001 | Parker |
| 6,292,803 | B1 | 9/2001 | Richardson et al. |
| 6,304,876 | B1 | 10/2001 | Isip |
| 6,317,728 | B1 | 11/2001 | Kane |
| 6,327,702 | B1 | 12/2001 | Sauntry et al. |
| 6,336,114 | B1 | 1/2002 | Garrison |
| 6,353,819 | B1 | 3/2002 | Edwards et al. |
| 6,367,068 | B1 | 4/2002 | Vaidyanathan et al. |
| 6,389,414 | B1 | 5/2002 | Delo et al. |
| 6,389,462 | B1 | 5/2002 | Cohen et al. |
| 6,438,537 | B1 | 8/2002 | Netz et al. |
| 6,446,069 | B1 | 9/2002 | Yaung et al. |
| 6,460,037 | B1 | 10/2002 | Weiss et al. |
| 6,473,750 | B1 | 10/2002 | Petculescu et al. |
| 6,487,552 | B1 | 11/2002 | Lei et al. |
| 6,496,833 | B1 | 12/2002 | Goldberg et al. |
| 6,505,189 | B1 | 1/2003 | Au et al. |
| 6,505,241 | B2 | 1/2003 | Pitts |
| 6,510,551 | B1 | 1/2003 | Miller |
| 6,530,075 | B1 | 3/2003 | Beadle et al. |
| 6,538,651 | B1 | 3/2003 | Hayman et al. |
| 6,546,402 | B1 | 4/2003 | Beyer et al. |
| 6,553,375 | B1 | 4/2003 | Huang et al. |
| 6,584,474 | B1 | 6/2003 | Pereira |
| 6,604,104 | B1 | 8/2003 | Smith |
| 6,618,720 | B1 | 9/2003 | On Au et al. |
| 6,631,374 | B1 | 10/2003 | Klein et al. |
| 6,640,234 | B1 | 10/2003 | Coffen et al. |
| 6,697,880 | B1 | 2/2004 | Dougherty |
| 6,701,415 | B1 | 3/2004 | Hendren |
| 6,714,962 | B1 | 3/2004 | Helland et al. |
| 6,725,243 | B2 | 4/2004 | Snapp |
| 6,732,100 | B1 | 5/2004 | Brodersen et al. |
| 6,745,332 | B1 | 6/2004 | Wong et al. |
| 6,748,374 | B1 | 6/2004 | Madan et al. |
| 6,748,455 | B1 | 6/2004 | Hinson et al. |
| 6,760,719 | B1 | 7/2004 | Hanson et al. |
| 6,775,660 | B2 | 8/2004 | Lin et al. |
| 6,785,668 | B1 | 8/2004 | Polo et al. |
| 6,795,851 | B1 | 9/2004 | Noy |
| 6,816,855 | B2 | 11/2004 | Hartel et al. |
| 6,820,082 | B1 | 11/2004 | Cook et al. |
| 6,829,620 | B2 | 12/2004 | Hsing et al. |
| 6,832,229 | B2 | 12/2004 | Reed |
| 6,851,088 | B1 | 2/2005 | Conner et al. |
| 6,882,994 | B2 | 4/2005 | Yoshimura et al. |
| 6,925,472 | B2 | 8/2005 | Kong |
| 6,934,717 | B1 | 8/2005 | James |
| 6,947,928 | B2 | 9/2005 | Dettinger et al. |
| 6,983,291 | B1 | 1/2006 | Cochrane et al. |
| 6,985,895 | B2 | 1/2006 | Witkowski et al. |
| 6,985,899 | B2 | 1/2006 | Chan et al. |
| 6,985,904 | B1 | 1/2006 | Kaluskar et al. |
| 7,020,649 | B2 | 3/2006 | Cochrane et al. |
| 7,024,414 | B2 | 4/2006 | Sah et al. |
| 7,031,962 | B2 | 4/2006 | Moses |
| 7,058,657 | B1 | 6/2006 | Berno |
| 7,089,228 | B2 | 8/2006 | Arnold et al. |
| 7,089,245 | B1 | 8/2006 | George et al. |
| 7,096,216 | B2 | 8/2006 | Anonsen |
| 7,103,608 | B1 | 9/2006 | Ozbutun et al. |
| 7,110,997 | B1 | 9/2006 | Turkel et al. |
| 7,127,462 | B2 | 10/2006 | Hiraga et al. |
| 7,146,357 | B2 | 12/2006 | Suzuki et al. |
| 7,149,742 | B1 | 12/2006 | Eastham et al. |
| 7,167,870 | B2 | 1/2007 | Avvari et al. |
| 7,171,469 | B2 | 1/2007 | Ackaouy et al. |
| 7,174,341 | B2 | 2/2007 | Ghukasyan et al. |
| 7,181,686 | B1 | 2/2007 | Bahrs |
| 7,188,105 | B2 | 3/2007 | Dettinger et al. |
| 7,200,620 | B2 | 4/2007 | Gupta |
| 7,216,115 | B1 | 5/2007 | Walters et al. |
| 7,216,116 | B1 | 5/2007 | Nilsson et al. |
| 7,225,189 | B1 | 5/2007 | McCormack et al. |

(56) References Cited

U.S. PATENT DOCUMENTS

| | | |
|---|---|---|
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,529,734 B2 | 5/2009 | Dirisala |
| 7,529,750 B2 | 5/2009 | Bair |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0111492 A1 | 6/2004 | Nakahara et al. |
| 2004/0148630 A1* | 7/2004 | Choi .............. H04N 21/4349 725/53 |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Von Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |

(56) References Cited

U.S. PATENT DOCUMENTS

| | | |
|---|---|---|
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1* | 12/2009 | Rowney ............ G06F 17/30516 726/26 |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1* | 6/2011 | Williamson ...... G06F 17/30961 707/812 |
| 2011/0167020 A1 | 7/2011 | Yang et al. |
| 2011/0194563 A1 | 8/2011 | Shen et al. |
| 2011/0314019 A1 | 12/2011 | Jimenez Peris et al. |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | ERDOGAN et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1* | 7/2014 | Reddy ............... G06F 17/30554 707/722 |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0372482 A1 | 12/2014 | Martin et al. |
| 2014/0380051 A1 | 12/2014 | Branish, II et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0127599 A1 | 5/2015 | Schiebeler |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2016/0026442 A1 | 1/2016 | Chhaparia |
| 2016/0065670 A1 | 3/2016 | Kimmel et al. |
| 2016/0125018 A1 | 5/2016 | Tomoda et al. |
| 2016/0253294 A1 | 9/2016 | Allen et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 0000879 A2 | 1/2000 |
| WO | 0179964 A2 | 10/2001 |

(56) References Cited

FOREIGN PATENT DOCUMENTS

| WO | 2011120161 A1 | 10/2011 |
|---|---|---|
| WO | 2012136627 A1 | 10/2012 |
| WO | WO-2014026220 A1 | 2/2014 |
| WO | 2014143208 A1 | 9/2014 |

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Sophia Database—Architecture", dated Jan. 18, 2016. Retrieved from https://web.archive.org/web/20160118052919/http://sphia.org/architecture.html.
"Google Protocol RPC Library Overview", dated Apr. 27, 2016. Retrieved from https://cloud.google.com/appengine/docs/python/tools/protorpc/ (last accessed Jun. 16, 2016).
"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Oracle® Big Data Appliance—Software User's Guide", dated Feb. 2015. Retrieved from https://docs.oracle.com/cd/E55905_01/doc.40/e55814.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retrieved from http://public.dhe.ibm.com/ps/products/db2/info/vr95/pdf/en_US/DB2PerfTuneTroubleshoot-db2d3e953.pdf.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
Borror, Jefferey A. "Q for Mortals 2.0", dated Nov. 1, 2011 Retreived from http://code.kx.com/wiki/JB:QforMortals2/contents.
Gai, Lei et al. "An Efficient Summary Graph Driven Method for RDF Query Processing", dated Oct. 27, 2015. Retreived from http://arxiv.org/pdf/1510.07749.pdf.
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Non-final Office Action mailed Sep. 9, 2016, in U.S. Appl. No. 15/154,996.
Non-final Office Action mailed Sep. 9, 2016, in U.S. Appl. No. 15/155,010.
Notice of Allowance mailed Dec. 19, 2016, in U.S. Appl. No. 15/155,001.
Notice of Allowance mailed Dec. 22, 2016, in U.S. Appl. No. 15/155,011.
Notice of Allowance mailed Dec. 7, 2016, in U.S. Appl. No. 15/154,985.
Notice of Allowance mailed Feb. 1, 2017, in U.S Appl. No. 15/154,988.
Notice of Allowance mailed Jan. 30, 2017, in U.S. Appl. No. 15/154,987.
Notice of Allowance mailed Nov. 17, 2016, in U.S. Appl. No. 15/154,991.
Notice of Allowance mailed Nov. 21, 2016, in U.S. Appl. No. 15/154,983.
Notice of Allowance mailed Nov. 8, 2016, in U.S. Appl. No. 15/155,007.
Notice of Allowance mailed Oct. 11, 2016, in U.S. Appl. No. 15/155,007.
Notice of Allowance mailed Oct. 21, 2016, in U.S. Appl. No. 15/154,999.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "Pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "Pandas: powerful Python data analysis toolkit, Release 0.18.1" Dated May 3, 2016. Retrieved from: http://pandas.pydata.org/pandas-docs/version/0.18.1/index.html.

(56) References Cited

OTHER PUBLICATIONS

Ex Parte Quayle Action mailed Aug. 8, 2016, in U.S Appl. No. 15/154,999.
Final Office Action mailed Dec. 19, 2016, in U.S. Appl. No. 15/154,995.
Final Office Action mailed Jan. 27, 2017, in U.S. Appl. No. 15/154,980.
Final Office Action mailed Jan. 31, 2017, in U.S. Appl. No. 15/154,996.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Apln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatio-Temporal Data", Technical Report TR 04-21, Sep. 2004, University of Alberta, Department of Computing Science.
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action mailed Aug. 12, 2016, in U.S. Appl. No. 15/155,001.
Non-final Office Action mailed Aug. 16, 2016, in U.S. Appl. No. 15/154,993.
Non-final Office Action mailed Aug. 19, 2016, in U.S. Appl. No. 15/154,991.
Non-final Office Action mailed Aug. 25, 2016, in U.S. Appl. No. 15/154,980.
Non-final Office Action mailed Aug. 26, 2016, in U.S. Appl. No. 15/154,995.
Non-final Office Action mailed Aug. 8, 2016, in U.S. Appl. No. 15/154,983.
Non-final Office Action mailed Aug. 8, 2016, in U.S. Appl. No. 15/154,985.
Non-final Office Action mailed Nov. 17, 2016, in U.S. Appl. No. 15/154,999.
Non-final Office Action mailed Oct. 13, 2016, in U.S. Appl. No. 15/155,009.
Non-final Office Action mailed Oct. 27, 2016, in U.S. Appl. No. 15/155,006.
Non-final Office Action mailed Oct. 7, 2016, in U.S. Appl. No. 15/154,998.
Non-final Office Action mailed Sep. 1, 2016, in U.S. Appl. No. 15/154,979.
Non-final Office Action mailed Sep. 1, 2016, in U.S. Appl. No. 15/155,011.
Non-final Office Action mailed Sep. 1, 2016, in U.S. Appl. No. 15/155,012.
Non-final Office Action mailed Sep. 14, 2016, in U.S. Appl. No. 15/154,984.
Non-final Office Action mailed Sep. 16, 2016, in U.S. Appl. No. 15/154,988.
Non-final Office Action mailed Sep. 22, 2016, in U.S. Appl. No. 15/154,987.
Non-final Office Action mailed Sep. 26, 2016, in U.S. Appl. No. 15/155,005.
Non-final Office Action mailed Sep. 8, 2016, in U.S. Appl. No. 15/154,975.
Final Office Action mailed Feb. 24, 2017, in U.S. Appl. No. 15/154,993.
Non-final Office Action mailed Feb. 8, 2017, in U.S. Appl. No. 15/154,997.
Notice of Allowance mailed Feb. 14, 2017, in U.S. Appl. No. 15/154,979.

\* cited by examiner

510 – TABLE A Displayed Content

| Col. 1 512 | Col. 2 514 | Col. 3 516 | Col. 4 518 |
|---|---|---|---|
| SYMBOL | DATE | TIME | QUOTE |
| AAPL | 2/17/16 | 9:31 | $99.89 |
| CMI | 2/17/16 | 9:31 | $99.78 |
| SPY | 2/17/16 | 9:31 | $91.02 |
| AAPL | 2/17/16 | 9:32 | $100.31 |
| CMI | 2/17/16 | 9:32 | $100.03 |
| SPY | 2/17/16 | 9:32 | $91.20 |
| ... | ... | ... | ... |
| APPL | 2/17/16 | 16:00 | $98.15 |
| CMI | 2/17/16 | 16:00 | $99.27 |
| SPY | 2/17/16 | 16:00 | $90.50 |

520 – TABLE A Index

| Index # 522 | Column Source (CS) 524 | | | |
|---|---|---|---|---|
| # | CS1 # | CS2 # | CS3 # | CS4 # |
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 5 | 5 | 5 | 5 |
| ... | ... | ... | ... | ... |
| 98 | 98 | 98 | 98 | 98 |
| 99 | 99 | 99 | 99 | 99 |
| 100 | 100 | 100 | 100 | 100 |

Table B = Select Table A where Symbol = AAPL or CMI
530

532 – TABLE B Displayed Content

| Col. 1 534 | Col. 2 536 | Col. 3 538 | Col. 4 540 |
|---|---|---|---|
| SYMBOL | DATE | TIME | QUOTE |
| AAPL | 2/17/16 | 9:31 | $99.89 |
| CMI | 2/17/16 | 9:31 | $99.78 |
| AAPL | 2/17/16 | 9:32 | $100.31 |
| CMI | 2/17/16 | 9:32 | $100.03 |
| ... | ... | ... | ... |
| AAPL | 2/17/16 | 16:00 | $98.15 |
| CMI | 2/17/16 | 16:00 | $99.27 |

542 – TABLE B Index to Column Sources

| Index # 544 | Column Source (CS) 546 | | | |
|---|---|---|---|---|
| # | CS1 # | CS2 # | CS3 # | CS4 # |
| 0 | 0 | 0 | 0 | 0 |
| 1 | 1 | 1 | 1 | 1 |
| 3 | 3 | 3 | 3 | 3 |
| 4 | 4 | 4 | 4 | 4 |
| ... | ... | ... | ... | ... |
| 98 | 98 | 98 | 98 | 98 |
| 99 | 99 | 99 | 99 | 99 |

FIG. 5A

532 – TABLE B Displayed Content

| Col. 1 534 | Col. 2 536 | Col. 3 538 | Col. 4 540 |
|---|---|---|---|
| SYMBOL | DATE | TIME | QUOTE |
| AAPL | 2/17/16 | 9:31 | $99.89 |
| CMI | 2/17/16 | 9:31 | $99.78 |
| AAPL | 2/17/16 | 9:32 | $100.31 |
| CMI | 2/17/16 | 9:32 | $100.03 |
| ... | ... | ... | ... |
| AAPL | 2/17/16 | 16:00 | $98.15 |
| CMI | 2/17/16 | 16:00 | $99.27 |

542 – TABLE B Index

| Index # 544 | Column Source (CS) 546 | | | |
|---|---|---|---|---|
| # | CS1 # | CS2 # | CS3 # | CS4 # |
| 0 | 0 | 0 | 0 | 0 |
| 1 | 1 | 1 | 1 | 1 |
| 3 | 3 | 3 | 3 | 3 |
| 4 | 4 | 4 | 4 | 4 |
| ... | ... | ... | ... | ... |
| 98 | 98 | 98 | 98 | 98 |
| 99 | 99 | 99 | 99 | 99 |

TABLE_MAP = TABLE_B.byExternal("Symbol")
550

552 Table Map Indexes per Symbol

555 AAPL Subtable Displayed Content

| SYMBOL | DATE | TIME | QUOTE |
|---|---|---|---|
| AAPL | 2/17/16 | 9:31 | $99.89 |
| AAPL | 2/17/16 | 9:32 | $100.31 |
| ... | ... | ... | ... |
| AAPL | 2/17/16 | 16:00 | $98.15 |

554 AAPL Index

| Index # | CS 1 | CS 2 | CS 3 | CS 4 |
|---|---|---|---|---|
| 0 | 0 | 0 | 0 | 0 |
| 3 | 3 | 3 | 3 | 3 |
| ... | ... | ... | ... | ... |
| 98 | 98 | 98 | 98 | 98 |

556 CMI Index

| Index # | CS 1 | CS 2 | CS 3 | CS 4 |
|---|---|---|---|---|
| 1 | 1 | 1 | 1 | 1 |
| 4 | 4 | 4 | 4 | 4 |
| ... | ... | ... | ... | ... |
| 99 | 99 | 99 | 99 | 99 |

FIG. 5B

552 Table Map Indexes per Symbol

554 AAPL Index

| Index # | CS 1 | CS 2 | CS 3 | CS 4 |
|---|---|---|---|---|
| 0 | 0 | 0 | 0 | 0 |
| 3 | 3 | 3 | 3 | 3 |
| ... | ... | ... | ... | ... |
| 98 | 98 | 98 | 98 | 98 |

556 CMI Index

| Index # | CS 1 | CS 2 | CS 3 | CS 4 |
|---|---|---|---|---|
| 1 | 1 | 1 | 1 | 1 |
| 4 | 4 | 4 | 4 | 4 |
| ... | ... | ... | ... | ... |
| 99 | 99 | 99 | 99 | 99 |

TABLE_MAP_2 = TABLE_MAP.where("Quote > 100.0")
560

562 Table Map Indexes for Quotes > $100

564 AAPL Index

| Index # | CS 1 | CS 2 | CS 3 | CS 4 |
|---|---|---|---|---|
| 3 | 3 | 3 | 3 | 3 |
| ... | ... | ... | ... | ... |

566 CMI Index

| Index # | CS 1 | CS 2 | CS 3 | CS 4 |
|---|---|---|---|---|
| 4 | 4 | 4 | 4 | 4 |
| ... | ... | ... | ... | ... |

570 Subtable displayed content

572 AAPL subtable

| Symbol | Date | Time | Quote |
|---|---|---|---|
| AAPL | 2/17/16 | 9:32 | $100.31 |
| ... | ... | ... | ... |

574 CMI subtable

| Symbol | Date | Time | Quote |
|---|---|---|---|
| CMI | 2/17/16 | 9:32 | $100.03 |
| ... | ... | ... | ... |

FIG. 5C

DYNAMIC TABLE INDEX MAPPING

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for mapping a large data source index into smaller separate data source indexes that can be access more efficiently than a large data source index.

Computers are capable of managing large data sources such as large tables containing numerous columns and billions of rows. And many of these large tables can add thousands of rows of data per second. Such a system could be collecting table rows from large real-time streams of data, such as stock data feeds and the associated quotes and trades for millions of individual quotes and trades of the trading day. Users may have a need to find information in these large tables quickly, especially if a query result is needed to make a real-time decision, such as buy or sell. If the query takes too long to complete a real-time decision may not be possible and the real-time decision is downgraded to an after-the-fact decision. Users may also want to be able to display subsets of a table in a GUI and flip between the subsets of data. Further, users may want to break a table down into subtables and then be able to apply operations to the subtables with a language construct that allows easy execution.

Embodiments were conceived in light of the above mentioned needs, problems and/or limitations, among other things.

Some implementations can include a computer system for decreasing memory access and processing time in a computer system, the system comprising one or more processors, computer readable storage coupled to the one or more processors, the computer readable storage having stored thereon instructions that, when executed by the one or more processors, cause the one or more processors to perform operations. The operations can include sending a digital request for a remote query processor from a client computer to a remote query processor on a query server computer. The operations can further include at the remote query processor, retrieving a plurality of data stored in column sources, the plurality of data available from at least one of a low-speed memory and a high-speed memory. The operation can also include creating and storing in a high-speed computer memory separate from the low-speed computer memory in a query update graph a table object comprising a plurality of rows, the high-speed computer memory having lower access time than the low-speed computer memory. The operations can further include creating in the high-speed computer memory separate from the low-speed memory a table object index mapping data in the plurality of column sources to the table object, the high-speed memory having lower access time than the low-speed memory. The operations can also include designating in a high-speed computer memory the plurality of column sources as mapping columns having distinct data. The operations can include for each distinct datum or tuples in the mapping columns, creating a separate data index from the table object index, the separate data index pointing to a subset of the plurality of data stored in source columns, the subset associated with the distinct datum, and the subset effectively creating a subtable that can decrease processing time. The operations can include creating in the high-speed computer memory a table object listener, the table object listener configured automatically to receive by a computer signal a notification of any change to one or more rows of the table object, the high-speed memory having lower access time than the low-speed memory. The operations can further include when the table object listener receives a notification of any change of one or more rows of the table object, updating the separate data indexes created from the table object index accordingly.

The operations can include applying a grouping formula to the the plurality of data stored in source columns when creating the separate index from the table object index.

The operations can include forwarding the notification of a change to one or more rows of the table object to child nodes created by the table query operations.

The operations can include performing query operations on the separate data indexes.

The operations can include wherein the operations of the remote query processor further include returning operation results with strict ordering to guarantee ordering.

The operations can also include wherein any change to one or more rows of the table object includes at least one of a row addition, a row modification, a row deletion, and a re-indexing of the rows.

Some implementations can include a method for decreasing memory access and processing time in a computer system, the method comprising storing in a computer memory a plurality of data stored in column sources. The method can also include creating and storing in the computer memory in a query update graph a table object comprising a plurality of rows. The method can further include creating in the computer memory a table object index mapping data in the plurality of data stored in column sources to the table object. The method can also include designating in the computer memory the plurality of data stored in column sources as mapping columns having distinct data. The method can include for each distinct datum or tuples in the mapping columns, creating a separate data index from the table object index, the separate data index pointing to a subset of the plurality of data stored in source columns, the subset associated with the distinct datum, and the subset effectively creating a subtable that can decrease processing time. The method can also include using a processor to create in the computer memory a table object listener, the table object listener configured automatically to receive by a computer signal a notification of a change to one or more rows of the table object. The method can include when the table object listener receives a notification of a change one or more rows of the table object, updating the separate data indexes created from the table object index accordingly.

The method can also include applying a grouping formula to the plurality of data stored in source columns when creating the separate index from the table object index.

The method can include forwarding the notification of a change to one or more rows of the table object to child nodes created by the table query operations.

The method can also include using a processor to manipulate, with table query operations, the separate data indexes to obtain a subset of the separate data indexes.

The method can include wherein the creating and updating the separate data indexes maintain strict ordering to guarantee ordering.

The method can also include wherein any change to one or more rows of the table object includes at least one of a row addition, a row modification, a row deletion, and a re-indexing of the rows.

Some implementations can include a nontransitory computer readable medium having stored thereon software instructions that, when executed by one or more processors, cause the one or more processors to perform operations. The operations can include storing in a computer memory a plurality of data stored in column sources. The operations can further include creating and storing in the computer memory in a query update graph a table object comprising a plurality of rows. The operations can also include creating in the computer memory a table object index mapping data in the plurality of data stored in column sources to the table object. The method can include designating in the computer memory the plurality of data stored in column sources as mapping columns having distinct data. The operations can include for each distinct datum or tuples in the mapping columns, creating a separate data index from the table object index, the separate data index pointing to a subset of the plurality of data stored in source columns, the subset associated with the distinct datum, and the subset effectively creating a subtable that can decrease processing time. The operations can also include using a processor to create in the computer memory a table object listener, the table object listener configured automatically to receive by a computer signal a notification of any change to one or more rows of the table object. The operations can further include when the table object listener receives a notification of any change one or more rows of the table object, updating the separate data indexes created from the table object index accordingly.

The operations can also include applying a grouping formula to the the plurality of data stored in source columns when creating the separate index from the table object index.

The operations can also include forwarding the notification of a change to one or more rows of the table object to child nodes created by the table query operations.

The operations can include using a processor to manipulate, with table query operations, the separate data indexes to obtain a subset of the separate data indexes.

The operations can include wherein the operations further include returning operation results with strict ordering to guarantee ordering.

The operations can also include wherein any change to one or more rows of the table object includes at least one of a row addition, a row modification, a row deletion, and a re-indexing of the rows.

BRIEF DESCRIPTION OF THE DRAWINGS

FIG. 5A is a diagram of an example table object created from a base table object.

FIG. 5B is a diagram of an example table index mapping operation.

FIG. 5C is a diagram of an example table map index manipulation.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
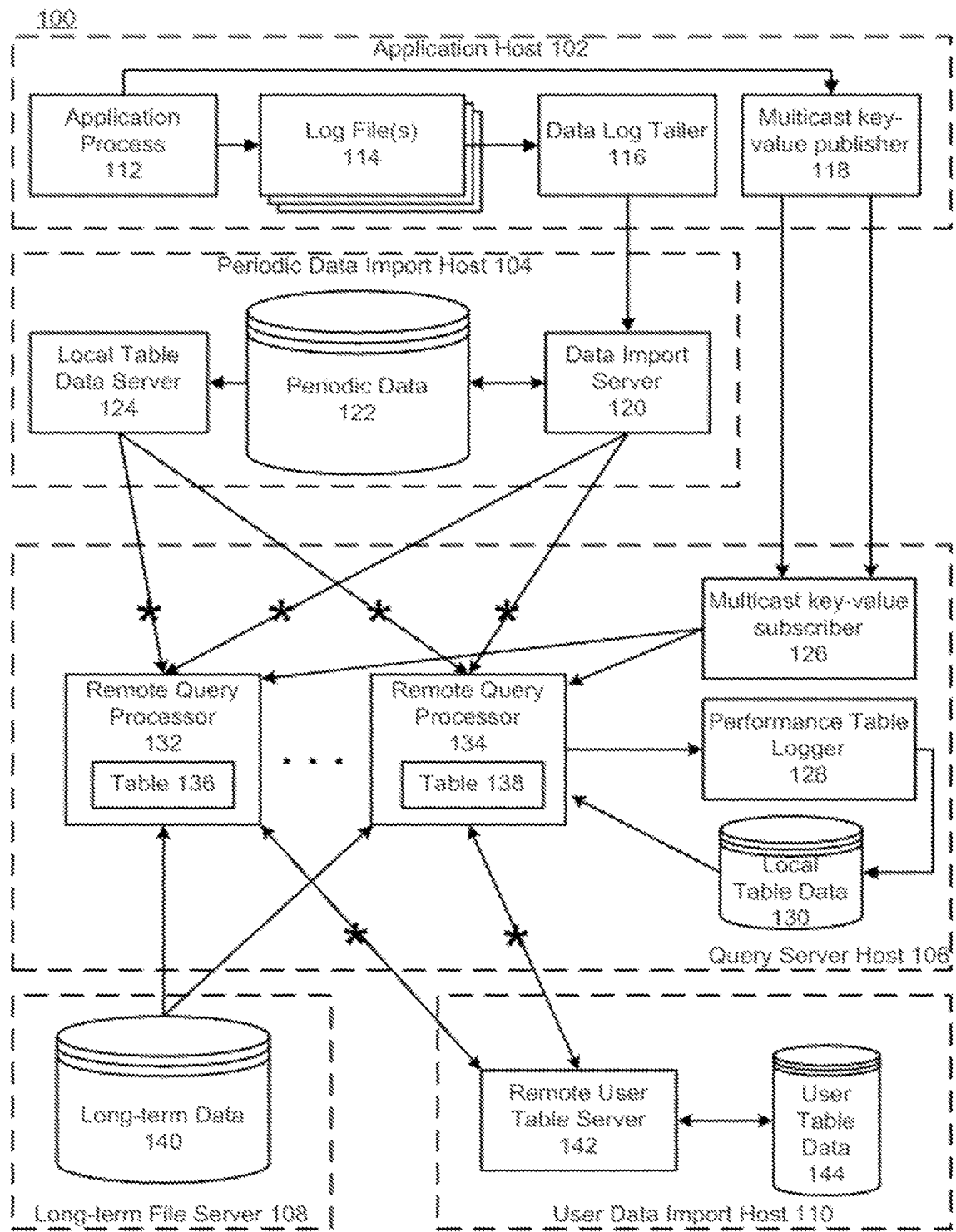
FIG. 1 is a diagram of an example computer data system showing an example data distribution configuration in accordance with some implementations.
Figure 2:
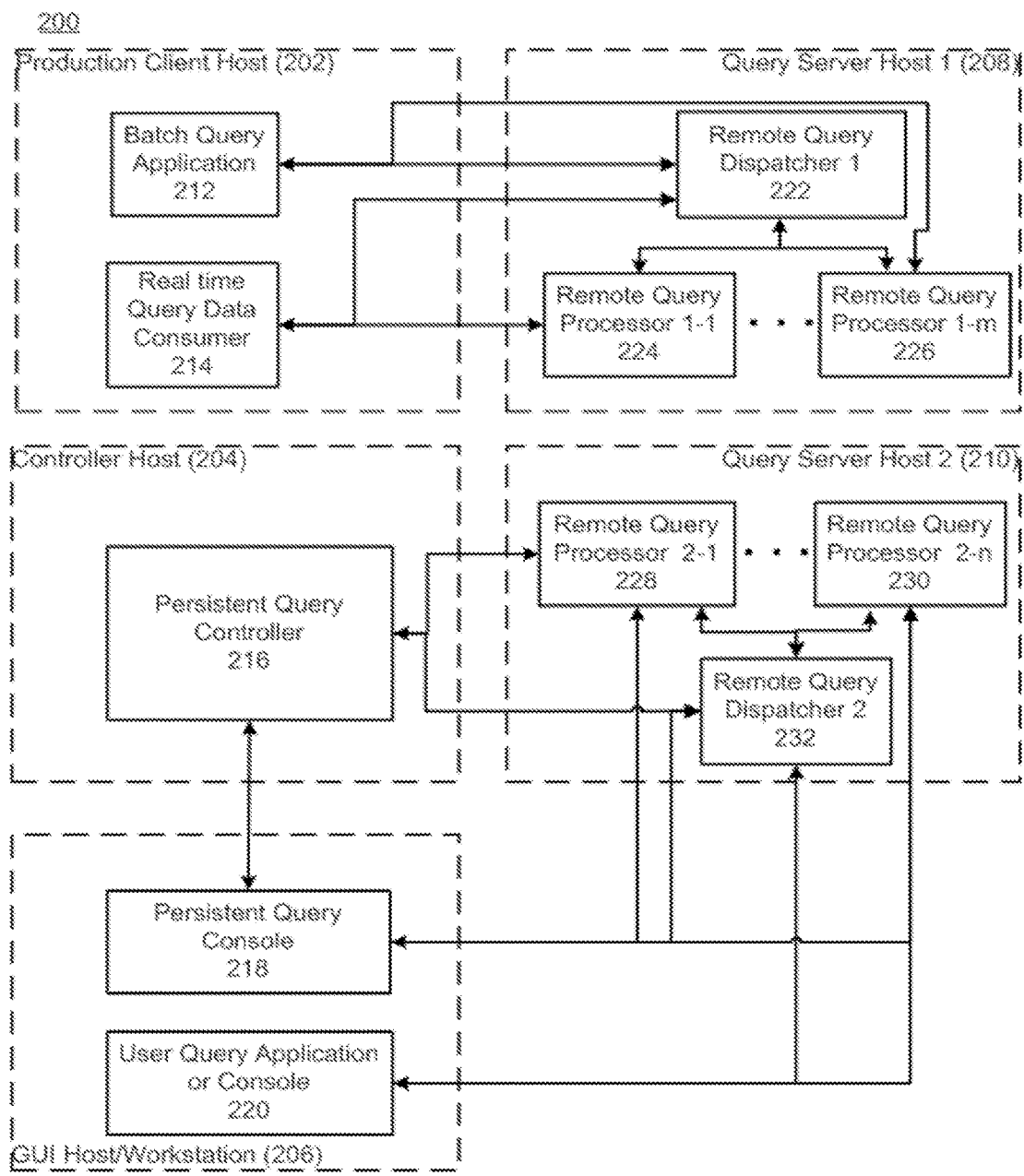
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
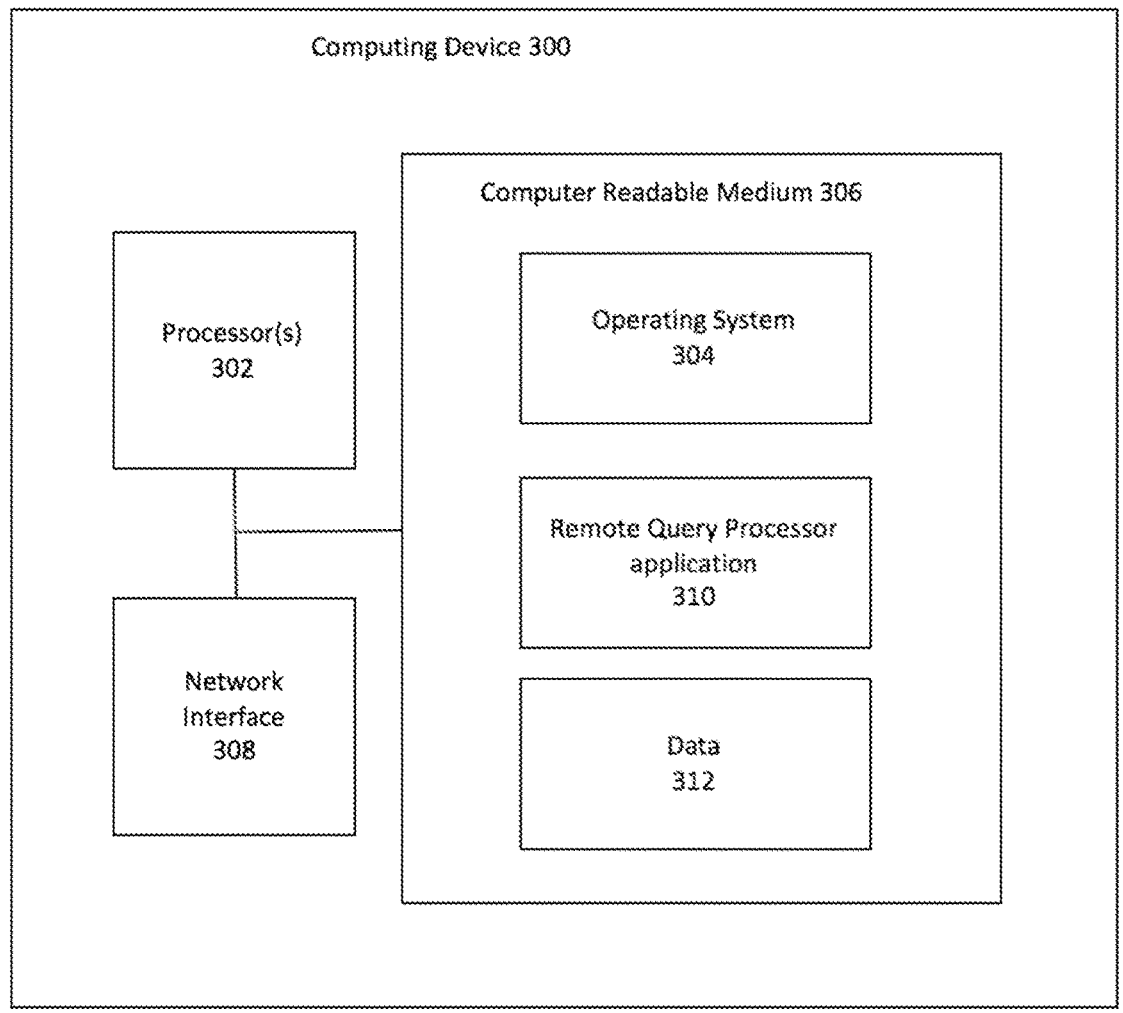
FIG. 3 is a diagram of an example computing device configured for table map processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include remote query processor application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for dynamic table index mapping in accordance with the present disclosure (e.g., performing one or more of 602-610 described below).

The application program 310 can operate in conjunction with the data section 312 and the operating system 304.

In general, some implementations can include a computer data system that stores and retrieves data (e.g., time series data) according to strict ordering rules. These rules ensure that data is stored in a strict order and that results of a query are evaluated and returned in the same order each time the query is executed. This can provide an advantage of optimizing the query code for query execution speed by permitting a user and query process (e.g., a remote query processor) to rely on an expected ordering and eliminate a need for performing an additional sorting operation on query results to achieve an expected or needed ordering for downstream operations. It also allows data to be ordered according to the source's data publication order without necessarily including data elements to refer to for query evaluation or result ordering purposes. It should be noted that updates from real-time or changing data, however, may not always be seen in the same order, since data is processed after asynchronous notifications and according to refresh cycles that progress at different speed and frequency in distinct remote query processors or client processes. Updates are not necessarily the results of a query, though. For some implementations order within a partition is always maintained.

For example, in the real-time (or periodic) case, a data system may store data in arrival order (which is typically time-series order) within the partition of the table that corresponds to a given data source. In the permanent-store case (or long term storage case), the computer data system starts with the real-time order and then re-partitions, optionally groups, and optionally sorts the real-time (or periodic) data according to one or more columns or formulas, otherwise respecting the retrieval order for the real-time data when producing the new stored data and its ordering.

Some implementations can include a partitioned data store that has partitions based, at least in part, on a file system and can include physical machine partitions, virtual machine partitions and/or file system directory structure partitions. For example, partitions A, B and C of a data store (e.g., a column data source) may reside in different directories of a file system. In addition to different directories, the data store may be distributed across a plurality of data servers (physical or virtual) such that the data is partitioned to a given server and within that server, the data may be sub-partitioned to one or more directories, and within each directory, the data may be further partitioned into one or more sub-directories and/or one or more files.

Partitioning the data using a file system provides an advantage in that the location keys and retrieval instructions for storage locations of interest for potential query result data can be discovered by means of traversing a directory structure, rather than a separately-maintained location key and location retrieval information discovery service. Once discovered, locations can be narrowed from the full set of locations to a sub-set according to query instructions, which can help speed up query operations by permitting the data system to defer accessing actual data ("lazy loading") and begin to narrow down the set of rows to evaluate without handling data (e.g., in memory and/or transmitting via a communication network). This is further enhanced by support in the data system's query engine for partitioning columns—columns of the data that are a property of all rows in any location retrieved from a given partition of the location key space, typically embodied in the name of a sub-directory when a file system is used in this way. Certain query operations can thus be executed in whole or in part against location key fields on a per-partition basis rather than against column data on a per-row basis. This may greatly improve execution performance by decreasing the input size of the calculations by several orders of magnitude.

Within a partition, data may be grouped according to a column value. The grouping may have one or more levels, with a multi-level grouping having a logical hierarchy based on the values of two or more columns, such that groups in "higher-level" columns fully-enclose groups in "lower-level" columns. Further, within a partition or group, the data can be ordered according to a given ordering scheme, e.g. strictly by the real-time recording order, or according to some sorting criteria. Grouping in this way can enhance query performance by allowing for very simple, high performance data indexing, and by increasing the physical locality of related data, which in turn can reduce the number of rows or blocks that must be evaluated, and/or allow for extremely performant data caching and pre-fetching, with high cache hit ratios achieved with smaller cache sizes than some other data systems.

For example, securities trading data may be partitioned across servers by a formula that takes ticker symbol as input. Within each server, the data may be partitioned by a directory corresponding to trade data date. Within each date partition directory, data may be in a file grouped by one or more ticker symbol values. Within each ticker symbol group, the data may be ordered by time.

In another example, when generating a query result table, the data system can first focus on a server (or servers) for the symbol (or symbols) being accessed, then one or more partitions for the date(s) of interest, then one or more files and group(s) within the file(s) before any data is actually accessed or moved. Once the data system resolves the actual data responsive to the query, the data (or references to the data in one or more data sources) can be retrieved and stored into a query result table according to a strict ordering and will be evaluated and returned in that same order each time the query is executed.

It will be appreciated that some data stores or tables can include data that may be partitioned, grouped, and/or ordered. For example, some data may be partitioned and ordered, but not grouped (e.g., periodic data such as intraday trading data). Other data may be partitioned, grouped and ordered (e.g., long-term storage data such as historical trading data). Also it will be appreciated that any individual table, partition or group can be ordered. Partitions can be grouped according to a grouping and/or ordering specific to each partition.

Large data systems can be dynamic in nature with continuing steams of data being added by the second or even the microsecond. Tables can become quite large and cumbersome to query. A system's processor and memory use can benefit from splitting a large table source into smaller index mappings of the larger table source. To relieve the system from constantly re-performing queries against a large data source, the large data source can be mapped into smaller indexed data of interest.

Figure 4:
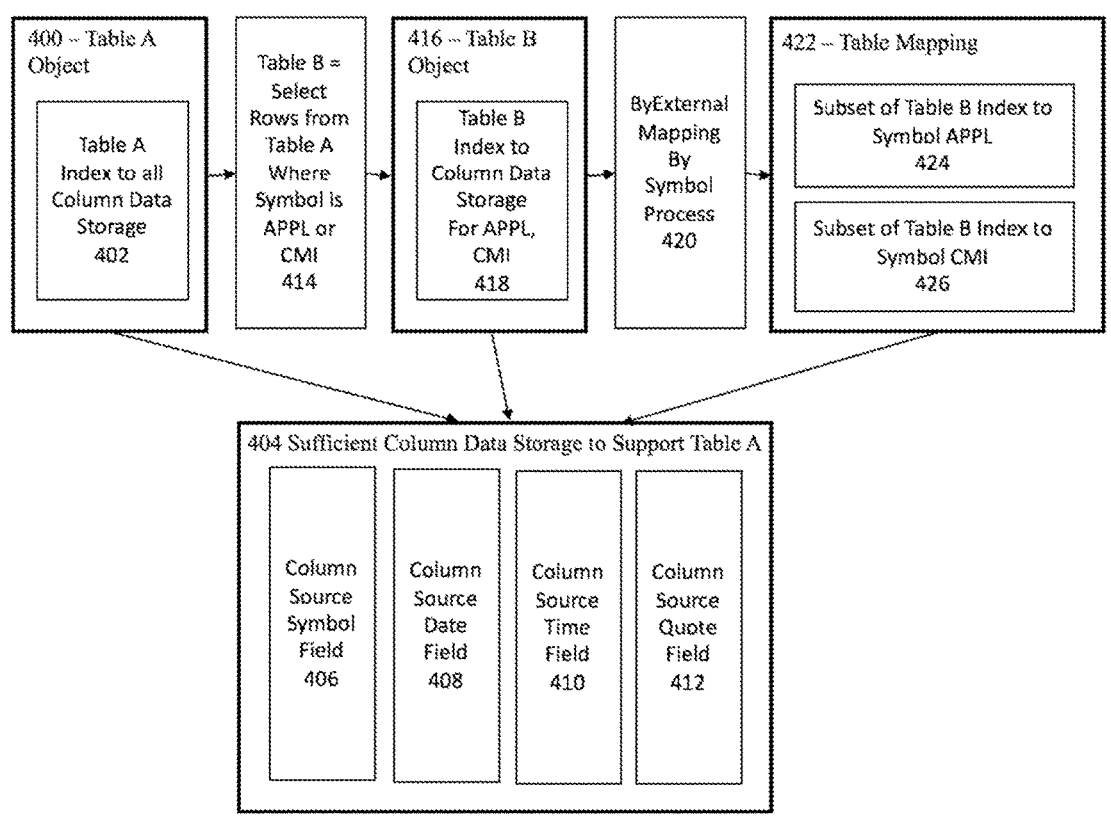
FIG. 4 is a diagram of an example filter operation followed by an external index mapping operation.

FIG. 4 is a diagram of an example filter operation followed by an external table index mapping. A table A object 400 can be created by designating data columns and a data source for populating the columns. For example, the data columns can be created as a symbol column, a date column, a time column and a quote column. The data source can be located in a data storage area 404. The data storage area 404 can contain the column sources (406, 408, 410, 412) for populating the table A object 400 columns. For example, the data storage area 404 can contain a symbol column source 406, a date column source 408, a time column source 410, and a quote column source 412. A table A index 402 can be created and mapped to the column sources (406, 408, 410, 412). For example, a table index can describe which section of the column source are part of the table, as well as the positions of the column source within the table.

Filtering operations can be performed on the table A object 400. For example, a table B object 416 can be formed by selecting rows in table A object where the symbol is "AAPL" or "CMI" 414. A table B object index 418 can be created and mapped to the table A object column sources (406, 408, 410, 412) for the "AAPL" and "CMI" rows.

It will be appreciated that a column source can be maintained as an array of data. Because an array is naturally an index structure, a separate structure may not need to be added to a column source when the column source is kept in an array. A column source maintained as an array can also guarantee an ordering of the data because the ordering can be maintained by the array index structure.

A ByExternal mapping by symbol process 420 can be performed on the table B object 416. The ByExternal mapping by symbol process 420 can create a table mapping 422 that can include a separate subset of the table B object index for symbol AAPL 424 and a separate subset of table B object index for symbol CMI 426.

Figure 5:
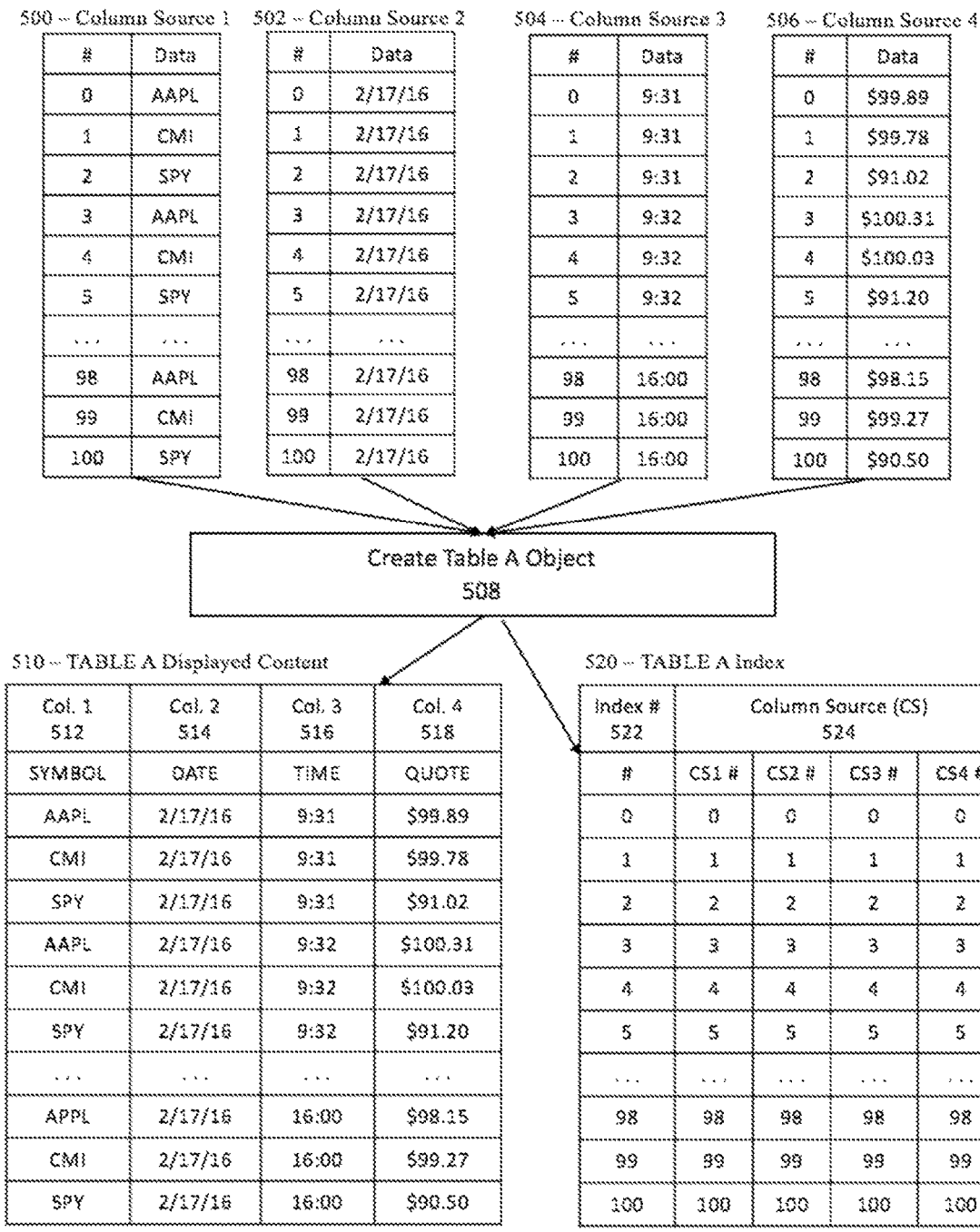
FIG. 5 is a diagram of an example table object creation from column sources.

FIG. 5 is a diagram of an example table A object creation from column sources. For example, each of the column sources (500, 502, 504, 506) can act as a dictionary that can map integers (#) to a value (data). The row integers (#s) can be matched across the four column sources (500, 502, 504, 506) to form a row of data. For example, row #3 across the column sources (500, 502, 504, 506) can create a row that contains "AAPL, 2/17/16, 9:32, $100.31."

A create table A object process or command 508 can be used to map the table A object rows to all the data found across column source 1 500, column source 2 502, column source 3 504, and column source 4 506. Table A can contain an index 520 that can be a mapping structure, which can contain valid row addresses from its constituent column sources (500, 502, 504, 506).

The table A index 520 can contain index #s 522 that can correspond to the same column source row #s 524 to create all of the table A object rows as shown in a table A displayed content 510. The table A displayed content 510 can be displayed on a graphical user interface (GUI). The table A object display content 510 can include column 1 512 integers (#) that can be mapped to the symbol column source 406, column 2 514 integers (#) that can be mapped to the date column source 408, column 3 516 integers (#) that can be mapped to the time column source 410, and column 4 518 integers (#) that can be mapped to the quote column source 412 by using the table A index 520 index integers (#s) 522 to all of the column sources 524 integers (#). Column sources 524 CS1 integers (#) maps to symbol column source 406, CS2 integers (#) to date column source 408, CS3 integers (#) to time column source 410, and CS4 integers (#) to quote column source 412. Mapping between a column name and a column source can be contained in a column source map (not shown).

It will be appreciated that a table object can have numerous column sources and is not limited to the column sources of the example. It will also be appreciated that the table A object 508 example created a base table object that can include all of the data found in the designated column sources. After a base table such as a table A object 508 is created, the base table can be transformed to be indexed to a subset of row #s found in the column sources.

It will also be appreciated that all of the integers do not always have to be stored. For example, a range of integers with associated values can be stored without explicitly storing each integer and value.

FIG. 5A is a diagram of an example table object created from a base table object. For example, a table B object can be created by selecting rows from a table A object where the Symbol=AAPL or CMI 530. A separate index can be created for the table B object to map the table B object to a subset of the data in the column sources 542. The index #s 544 for the table B index 542 can be a subset of the index #s 522 for the table A index. For example, the index #s 522 for the table A index can contain values from 0 through 100 without any gaps because the table A index is mapped to the entire data in the column sources 524. But because the table B object has only been mapped to the AAPL and CMI symbols, the index #s for SPY, index # value 2 in index # column 544 and index # value 100 in index # column 524, can be removed from index # column 544. The content that would be displayed for Table B 532 in a GUI can contain the column source 546 data mapped to the index #s 544 in the table B index 542. The table B object display can include the AAPL and CMI column 1 534 that can be mapped to the symbol column source 406 for AAPL and CMI values, column 2 536 that can be mapped to the date column source 408 for the associated AAPL and CMI dates, column 3 538 that can be mapped to the time column source 410 for the associated AAPL and CMI times, and column 4 540 that can be mapped to the quote column source 412 for the associated AAPL and CMI quotes because the table B index 542 contains index #s 544 to only the column source 546 indexes that contain AAPL and CMI.

FIG. 5B is a diagram of an example table index mapping operation. For example, the table B object from FIG. 5A can be mapped into table map indexes per symbol 552 by executing a ByExternal ("Symbol") command 550 with the table B index to column sources 542. The table B index 542 can contain index #s 544, which can be matched with the column sources 546 cs1 #, cs2 #, cs3 #, and cs4 #. The ByExternal ("Symbol") command 550 can operate on the table B index to column sources 542 to extract a separate index for each unique symbol value found in the symbol column 1 534. In the FIG. 5A example above, the table B index was filtered to contain only the symbols AAPL and CMI. Accordingly, when the ByExternal ("Symbol") command 550 is applied to the table B index, a separate AAPL index 554 and a separate CMI index 556 can be created because AAPL and CMI are the unique symbol values found in the table B index.

Continuing the example, in the separate table map indexes per symbol 552, the AAPL index 554 can contain only index #s that match the table B index 542 for the symbol AAPL, which in this example are index #s 544 (0, 3, 98) for AAPL. AAPL subtable displayed content 555 is an example of the content that can be displayed for a separate AAPL index 554 in a GUI. For the separate table map indexes per symbol 552 for CMI, the CMI index 556 can contain only index #s that match the table B index 542 for the CMI symbol, which in this example are index #s 544 (1, 4, 99) for CMI.

It will be appreciated that the syntax of the ByExternal command 550 is not limiting and only provided as an example function name and syntax. The underlying function or process called by the ByExternal command 550 can be named according to other language constructs and mnemonic creativity.

It will also be appreciated that the ByExternal command 550 can be applied to a table that has not been filtered, for example, the table A object in FIG. 5. The ByExternal command 550 can also be to applied to tables modified or created by joins and any other valid table-based operation.

It will further be appreciated that a ByExternal command 550 can contain one or more grouping columns.

FIG. 5C is a diagram of an example table map index manipulation. In the FIG. 5B example, separate map indexes were created for the AAPL and CMI symbols. Table map indexes such as table map indexes per symbol 552 can be manipulated with normal object table or table operations such as where clause filters, joins, other functions that combine data, and the like, in order to further focus on a smaller set of data and decrease the index size, which can lead to benefits in data access efficiency through smaller indexes. For example, a where clause can be executed to filter the table map indexes per symbol 552 to create separate symbol indexes for quotes greater than $100.00 560. The example results can be table map indexes for each symbol with quotes greater than $100 562. For example, when the table map indexes per symbol 552 are filtered for rows containing a quote greater than $100, the resulting table map indexes for quotes greater than $100 562 can be an AAPL index 564 and a CMI index 566. For example, AAPL index 564 can contain index #3 because AAPL index 554 #3 maps to the column source 1 500 #3 that has a data value of AAPL and to the column source 4 506 #3 that has a data value of $100.31. Continuing the example, CMI index 566 can contain index #4 because CMI index #4 maps to the column source 1 500 #4 that has a data value of CMI and to the column source 4 506 #4 that has a data value of $100.03. For example, when displayed in a GUI, a user can see subtable displayed content 570 that can contain AAPL subtable 572 and CMI subtable 574.

It will be appreciated that smaller indexes created from a large index can aid in the parallelization of query operation across multiple processors. Also, a byExternal command can be used to divide a large table into many different index blocks, which can each be processed on a rolling manner, for example, each block processed every 5 minutes at a 5 second offset from each another. Processing on a rolling manner permits all the data to be processed over the course of a chosen time period, but not all at once so that the performance/load burdens on the system are more evenly distributed over time.

Figure 6:
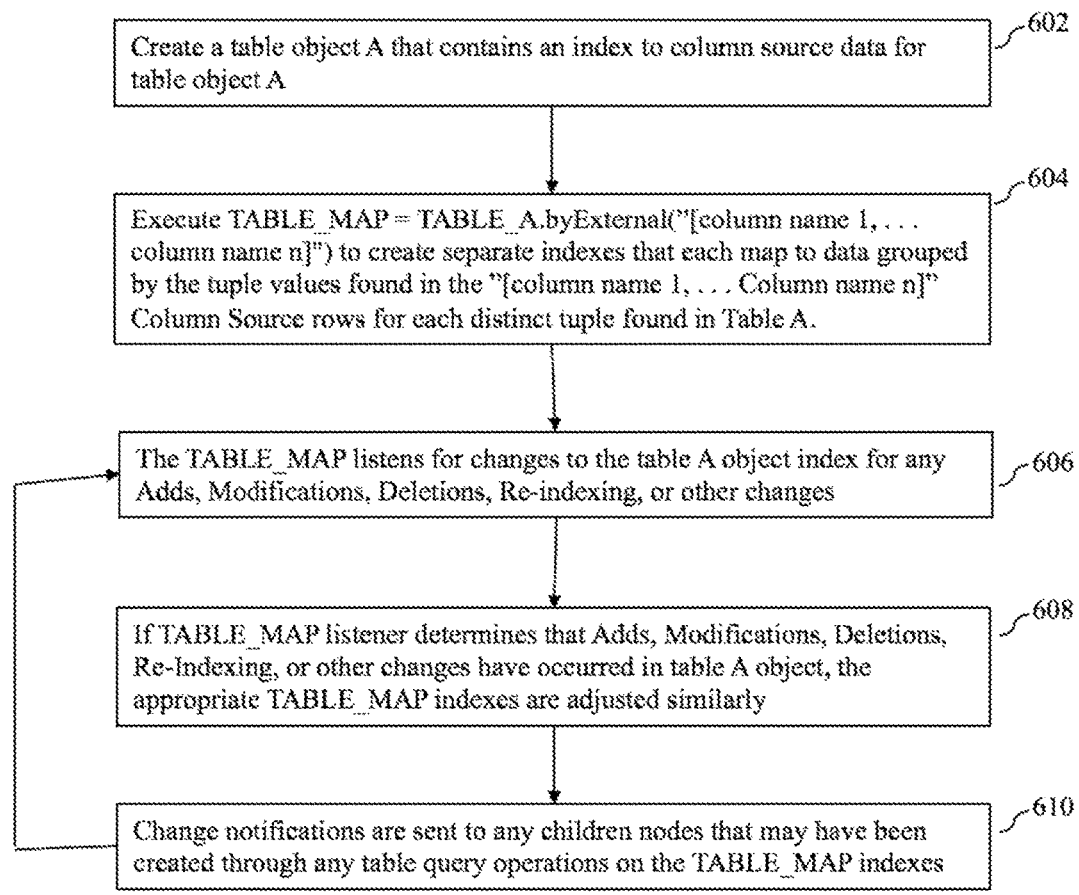
FIG. 6 is a flowchart of an example table index mapping process.

FIG. 6 is a flowchart of an example table index mapping process 600. Processing begins at 602, when a table A object is created with an index to column source data for populating the table A object. Processing continues to 604.

At 604, a command similar to TABLE_MAP= TABLE_A.byExternal ("[column name 1, ... column name n]") is executed to create separate TABLE_MAP indexes that map to column source rows for each each distinct column 1-column n tuple combination found in the table A object index.

It will be appreciated that a byExternal command is not limited to one column name and can accept multiple column names as arguments. When multiple column names are provided, the byExternal command can group the resulting mapping by tuples formed from the values in all of the provided multiple columns.

For example, a first column source can exist for "car manufacturers," a second column source can exist for "make," a third column source can exist for "model," and a fourth column source can exist for "year built." The car manufacturers column source can have hundreds of row values for "Ford," "Chevrolet," and "Fiat." Each row receives its own index #, for example starting with 0 through the number of rows minus one for the column source. And each of the make, model, and year built column sources can have the same index # for associated rows. Table objects can be mapped to the entirety of the column source content or can be a subset of column source content conditioned on a filtering statement such as a where clause, a sorting clause, or the like. The table A object example was created as a full table object without a filter clause and accordingly, contains a full set of column source data.

Continuing the example, when Table_Map= Table_A.byExternal ("car manufacturers") is executed, a Table_Map is created that contains a separate index for all Ford rows across all column sources with matching Ford index numbers, a separate index for all Chevrolet rows across all column sources with matching Chevrolet index numbers, and a separate index for all Fiat rows across all column sources with matching Fiat index numbers. Queries can now access an index specific to a single car manufacturer to increase efficiency in providing results specific to a particular car manufacturer. Logically, the byExternal command in this example has created a map containing one table index for each manufacturer.

Continuing the example, a table A index modification listener for the Table_Map is also created when Table_ Map=Table_A.byExternal ("car manufacturers") is executed. Table index modification listeners such as a table A index modification listener can be a software construct associated with a changing data source that can listen for events or changes that can occur in a changing data source or an index to a source. Examples of events or changes can include an addition of one or more rows to a table, a modification of one or more rows of a table, a deletion of one or more rows from a table, a re-indexing of table rows, and associated index changes.

It will be appreciated that the ByExternal command can include grouping by formula columns. For example, tm=t·byExternal ("Symbol", "A>10"). In this example, Symbol can be a normal column used for grouping and "A>10" can be a formula used for grouping. In this example, the tuple for executing byExternal would be (<symbol>, <true|false>).

It will also be appreciated that table A can have one modification listener. A remote query processor can remove, add, or modify rows to each of the table map indexes based on index updates to table A and new and previous values of the table map indexes. Each of the table map indexes can contain a node in a remote query processor update query graph that can produce an appropriate index notification. If the table map index nodes have downstream modification listeners, the downstream listeners can also be notified to update the associated downstream child nodes. Processing continues to 606.

At 606, The TABLE_MAP table A index modification listener listens for changes to the table A object index that occur when adds, modifications, deletions, re-indexing, or other changes occur in the table A object. In a real-time data processing environment when hundreds or thousands of rows are being added to a table every second, the associated indexes can also be updated to keep query results accurate. Processing continues to 608.

At 608, If the TABLE_MAP table A index modification listener determines that one or more rows have been added, deleted, modified or other changes such as re-indexing have occurred in the table A object or the table A index, changes are made to the TABLE_MAP indexes to keep the TABLE_MAP indexes in synchronization with the table A index. In continuing the car manufacturer example, if a new row for Ford is added with a new make, model, and built year, the index modification listener can detect that addition and cause the table_map to add a new row # and the associated column source index #s to the table_map index for Ford. Modification listeners to the ford table_map index would also receive notification, but listeners to the Chevrolet and Fiat table_map indexes would not receive the change notifications. Accordingly, the table_map indexes for Chevrolet and Fiat would not be effected.

It will be appreciated that if a new distinct column name value is added, the listener would identify the addition and the TABLE_MAP would create a new separate index mapping for that value when a supporting separate index is not found. For example, if Porsche is added as a new car manufacturer to the car manufacturer column because Porsche was added to the first column source, the Table_Map would not have a separate index for Porsche. The listener would detect the addition of the Porsche row and the Table_Map would create a new map index for the Porsche car manufacturer.

It will be appreciated that a modification listener can listen to a Table_Map in order to receive notifications of new table mapping indexes.

It will also be appreciated that in place of deleting a table, all table entries can be removed from the table and the table allowed to remain as an empty table.

It will further be appreciated that the invention is not limited to car manufacturer data or stock market data. Processing continues to 610.

At 610, change notifications are sent to any children nodes that may have been created through any table query operations on the TABLE_MAP indexes. Processing returns back to 606.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for table index mapping.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer system for decreasing memory access and processing time in a computer system, the system comprising:
one or more processors;
computer readable storage coupled to the one or more processors, the computer readable storage having stored thereon instructions that, when executed by the one or more processors, cause the one or more processors to perform operations including:
sending a digital request for a remote query processor from a client computer to a remote query processor on a query server computer;
at the remote query processor, performing operations including:
retrieving a plurality of data stored in column sources, the plurality of data available from at least one of a low-speed memory and a high-speed memory;
creating and storing in a high-speed computer memory separate from the low-speed computer memory in a query update graph a table object comprising a plurality of rows, the high-speed computer memory having lower access time than the low-speed computer memory;
creating in the high-speed computer memory separate from the low-speed memory a table object index mapping data in the plurality of column sources to the table object, the high-speed memory having lower access time than the low-speed memory;
designating in a high-speed computer memory the plurality of column sources as mapping columns having distinct data;
for each distinct datum or tuples in the mapping columns, creating a separate data index from the table object index, the separate data index pointing to a subset of the plurality of data stored in source columns, the subset associated with the distinct datum, and the subset effectively creating a subtable that can decrease processing time;
creating in the high-speed computer memory a table object listener, the table object listener configured automatically to receive by a computer signal a notification of any change to one or more rows of the table object, the high-speed memory having lower access time than the low-speed memory; and
when the table object listener receives a notification of any change of one or more rows of the table object, updating the separate data indexes created from the table object index accordingly.

2. The computer system of claim 1, further comprising applying a grouping formula to the plurality of data stored in source columns when creating the separate index from the table object index.

3. The computer system of claim 1, further comprising forwarding the notification of a change to one or more rows of the table object to child nodes created by the table query operations.

4. The computer system of claim 1, further comprising performing query operations on the separate data indexes.

5. The computer system of claim 1, wherein the operations of the remote query processor further include returning operation results with strict ordering to guarantee ordering.

6. The computer system of claim 1, wherein any change to one or more rows of the table object includes at least one of a row addition, a row modification, a row deletion, and a re-indexing of the rows.

7. A method for decreasing memory access and processing time in a computer system, the method comprising:
storing in a computer memory a plurality of data stored in column sources;
creating and storing in the computer memory in a query update graph a table object comprising a plurality of rows;
creating in the computer memory a table object index mapping data in the plurality of data stored in column sources to the table object;
designating in the computer memory the plurality of data stored in column sources as mapping columns having distinct data;
for each distinct datum or tuples in the mapping columns, creating a separate data index from the table object index, the separate data index pointing to a subset of the plurality of data stored in source columns, the subset associated with the distinct datum, and the subset effectively creating a subtable that can decrease processing time;
using a processor to create in the computer memory a table object listener, the table object listener configured automatically to receive by a computer signal a notification of a change to one or more rows of the table object; and
when the table object listener receives a notification of a change one or more rows of the table object, updating the separate data indexes created from the table object index accordingly.

8. The method of claim 7, further comprising applying a grouping formula to the plurality of data stored in source columns when creating the separate index from the table object index.

9. The method of claim 7, further comprising forwarding the notification of a change to one or more rows of the table object to child nodes created by the table query operations.

10. The method of claim 7, further comprising using a processor to manipulate, with table query operations, the separate data indexes to obtain a subset of the separate data indexes.

11. The method of claim 7, wherein the creating and updating the separate data indexes maintain strict ordering to guarantee ordering.

12. The method of claim 7, wherein any change to one or more rows of the table object includes at least a re-indexing of the rows.

13. A nontransitory computer readable medium having stored thereon software instructions that, when executed by one or more processors, cause the one or more processors to perform operations including:
storing in a computer memory a plurality of data stored in column sources;
creating and storing in the computer memory in a query update graph a table object comprising a plurality of rows;
creating in the computer memory a table object index mapping data in the plurality of data stored in column sources to the table object;
designating in the computer memory the plurality of data stored in column sources as mapping columns having distinct data;
for each distinct datum or tuples in the mapping columns, creating a separate data index from the table object index, the separate data index pointing to a subset of the plurality of data stored in source columns, the subset associated with the distinct datum, and the subset effectively creating a subtable that can decrease processing time;

using a processor to create in the computer memory a table object listener, the table object listener configured automatically to receive by a computer signal a notification of any change to one or more rows of the table object; and when the table object listener receives a notification of any change one or more rows of the table object, updating the separate data indexes created from the table object index accordingly.

14. The nontransitory computer readable medium of claim 13, further comprising applying a grouping formula to the plurality of data stored in source columns when creating the separate index from the table object index.

15. The nontransitory computer readable medium of claim 13, further comprising forwarding the notification of a change to one or more rows of the table object to child nodes created by the table query operations.

16. The nontransitory computer readable medium of claim 13, further comprising using a processor to manipulate, with table query operations, the separate data indexes to obtain a subset of the separate data indexes.

17. The nontransitory computer readable medium of claim 13, wherein the operations further include returning operation results with strict ordering to guarantee ordering.

18. The nontransitory computer readable medium of claim 13, wherein any change to one or more rows of the table object includes at least a re-indexing of the rows.

* * * * *